United States Patent
Elias

(10) Patent No.: US 9,650,995 B2
(45) Date of Patent: May 16, 2017

(54) HYBRID-CYCLE LIQUID PROPELLANT ROCKET ENGINE

(71) Applicant: Orbital Sciences Corporation, Dulles, VA (US)

(72) Inventor: Antonio L. Elias, McLean, VA (US)

(73) Assignee: ORBITAL SCIENCES CORPORATION, Dulles, VA (US)

(*) Notice: Subject to any disclaimer, the term of this patent is extended or adjusted under 35 U.S.C. 154(b) by 762 days.

(21) Appl. No.: 14/212,397

(22) Filed: Mar. 14, 2014

(65) Prior Publication Data
US 2014/0305098 A1 Oct. 16, 2014

Related U.S. Application Data

(60) Provisional application No. 61/787,344, filed on Mar. 15, 2013.

(51) Int. Cl.
*F02K 9/42* (2006.01)
*F02K 9/48* (2006.01)

(52) U.S. Cl.
CPC . *F02K 9/42* (2013.01); *F02K 9/48* (2013.01)

(58) Field of Classification Search
CPC ..... F02K 9/42; F02K 9/46; F02K 9/48; F02K 9/64; F02K 9/52; F02K 9/72
USPC .......................................... 60/205, 258, 259
See application file for complete search history.

(56) References Cited

U.S. PATENT DOCUMENTS

| | | | | |
|---|---|---|---|---|
| 4,073,138 A | * | 2/1978 | Beichel | F02K 9/48 60/245 |
| 4,771,600 A | | 9/1988 | Limerick et al. | |
| 4,831,818 A | * | 5/1989 | Martin | F02K 9/48 60/204 |
| 4,879,874 A | * | 11/1989 | Koyari | F02K 9/64 239/127.3 |
| 4,912,925 A | * | 4/1990 | Foust | F02K 9/566 244/135 C |
| 4,998,410 A | * | 3/1991 | Martinez-Leon | F02K 9/48 60/259 |

(Continued)

FOREIGN PATENT DOCUMENTS

EP 0 362 053 A1 4/1990

OTHER PUBLICATIONS

Manski et al., "Cycles for Earth-To-Orbit Propulsion," Journal of Propulsion and Power, Amer. Inst. of Aeronautics and Astronautics, vol. 14, No. 5, pp. 588-604 (1998).

*Primary Examiner* — Corey Skurdal
(74) *Attorney, Agent, or Firm* — Christensen Fonder P.A.

(57) ABSTRACT

Systems and methods are described herein for a hybrid liquid propellant rocket engine. In an embodiment, the engine includes a first pump powered by a first turbine, a second pump powered by a second turbine, and a gas generator. An output of the gas generator is connected to the first turbine and the second turbine. The engine further includes a third pump powered by a third turbine, a fourth pump powered by a fourth turbine, and a nozzle having an expander cycle in a wall and a combustion chamber. An output of the third pump is connected to the expander cycle and an output of the wall is connected to the third turbine and the fourth turbine. An output of the fourth pump, an output of the third turbine, and an output of the fourth turbine are connected to the combustion chamber.

20 Claims, 8 Drawing Sheets

(56) References Cited

U.S. PATENT DOCUMENTS

2008/0256925 A1* 10/2008 Pederson .................. F02K 9/48
                                                    60/258
2010/0024386 A1*  2/2010 Greene .................... F02K 9/42
                                                    60/204
2015/0354504 A1* 12/2015 Kawamata ............. B64G 1/401
                                                    60/217

* cited by examiner

600

602 PUMPING, AT A FIRST PUMP, A FIRST PORTION OF A FUEL TO A GAS GENERATOR, WHEREIN THE FIRST PUMP IS MECHANICALLY CONNECTED TO A FIRST TURBINE AND A SECOND TURBINE

604 PUMPING, AT A SECOND PUMP, A FIRST PORTION OF AN OXIDIZER TO A GAS GENERATOR, WHEREIN THE SECOND PUMP IS MECHANICALLY CONNECTED TO A THIRD TURBINE AND A FOURTH TURBINE

606 COMBUSTING, AT A GAS GENERATOR, THE FIRST PORTION OF THE FUEL AND THE FIRST PORTION OF THE OXIDIZER TO POWER THE FIRST PUMP AND THE SECOND PUMP

608 PUMPING, AT THE FIRST PUMP, A SECOND PORTION OF THE FUEL TO AN EXPANDER CYCLE IN A WALL OF A NOZZLE AND INTO THE SECOND TURBINE AND THE FOURTH TURBINE, WHEREIN AN OUTPUT OF THE SECOND TURBINE AND AN OUTPUT OF THE FOURTH TURBINE ARE PROVIDED TO A COMBUSTION CHAMBER IN THE NOZZLE

610 PUMPING, AT THE SECOND PUMP, THE SECOND PORTION OF THE OXIDIZER INTO THE COMBUSTION CHAMBER

612 COMBUSTING, AT THE COMBUSTION CHAMBER, THE SECOND PORTION OF THE FUEL AND THE SECOND PORTION OF THE OXIDIZER TO PROVIDE THRUST FROM THE NOZZLE

FIG. 6

HYBRID-CYCLE LIQUID PROPELLANT ROCKET ENGINE

CROSS-REFERENCE TO RELATED APPLICATION

This disclosure claims the benefit of U.S. Provisional Application No. 61/787,344, filed on Mar. 15, 2013, which is hereby incorporated by reference herein in its entirety.

BACKGROUND

Liquid propellant rocket engines (LPREs) use a chemical reaction between one or more propellants under pressure to generate thrust to propel a vehicle. The chemical reaction occurs in a combustion chamber of a rocket engine nozzle, producing thrust as the reaction products are forcefully expelled from the engine. To produce suitable thrust from the rocket engine, the one or more propellants must be pressurized. Pressurization can be achieved by storing one or more propellant(s) at a specified pressure or by using mechanical pumps to drive the flow of the propellants into the combustion chamber. Mechanical pumps used to pressurize the propellants may be powered by turbines, which in turn are driven by the flow of vaporized propellants. Propellants may be vaporized by heating, and thus expanding, the one or more propellants in a nozzle wall as combustion occurs in the rocket engine nozzle. Alternatively, some turbines do not use the flow of propellants to generate power and may be powered by exhaust gas resulting from the combustion of small quantities of the propellants.

Each of these methods has associated disadvantages. For example, the process of vaporizing propellants using heat generated in the combustion chamber has limitations to the types of propellants used in addition to the thrust generated by the engine. In another example, a gas generator process has limitations because a portion of each propellant is combusted in the gas generator and discarded as exhaust. Thus, in a gas generator process, each propellant is not used in its entirety to generate thrust from the rocket engine nozzle.

SUMMARY

In accordance with an embodiment of the disclosure, a system is provided for a hybrid rocket engine. The system includes a first pump powered by a first turbine, a second pump powered by a second turbine, and a gas generator connected to the first pump and the second pump. An output of the gas generator is connected to the first turbine and the second turbine to provide mechanical power to the first pump and the second pump. The system further includes a third pump powered by a third turbine, a fourth pump powered by a fourth turbine, and a nozzle that implements an expander cycle through heating of a propellant (fuel or oxidizer) in a wall around its nozzle, throat, and/or combustion chamber. An output of the third pump is connected to the expander cycle and an output of the expander cycle is connected to the third turbine and the fourth turbine to provide mechanical power to the third pump and the fourth pump. An output of the fourth pump, an output of the third turbine, and an output of the fourth turbine are connected to the combustion chamber.

In some implementations, an output of the first turbine and an output of the second turbine are expelled as exhaust. In some implementations, the first turbine, the second turbine, the third turbine, and the fourth turbine are isolated from one another. In some implementations, the first pump and the third pump are configured to pump a fuel, and the second pump and the fourth pump are configured to pump an oxidizer. In some implementations, the gas generator is configured to combust a portion of the fuel from the first pump and a portion of the oxidizer from the second pump to produce a gas that powers the first pump and the second pump.

In accordance with an embodiment of the disclosure, a system is provided for a hybrid rocket engine. The system includes a first pump powered by a first turbine and a second turbine. The first turbine and the second turbine are mechanically connected. The system further includes a second pump powered by a third turbine and a fourth turbine. The third turbine and the fourth turbine are mechanically connected. The system further includes a gas generator connected to the first pump and the second pump. An output of the gas generator is connected to the first turbine and the third turbine to provide mechanical power to the first pump and the second pump. The system further includes a nozzle that has an expander cycle in a wall and a combustion chamber. An output of the first pump is connected to the expander cycle and an output of the expander cycle is connected to the second turbine and the fourth turbine to provide mechanical power to the first pump and the second pump. An output of the second pump, an output of the third turbine, and an output of the fourth turbine are connected to the combustion chamber.

In some implementations, an output of the first turbine and an output of the second turbine are expelled as exhaust. In some implementations, the first turbine and the second turbine are connected in series to the first pump, and the third turbine and the fourth turbine are connected in series to the second pump. In some implementations, the first pump is configured to pump a fuel and the second pump is configured to pump an oxidizer. In some implementations, the gas generator is configured to combust a portion of the fuel from the first pump and a portion of the oxidizer from the second pump to produce a gas that powers the first pump and the second pump.

In accordance with an embodiment of the disclosure, a method is provided for combusting a fuel and an oxidizer in a hybrid rocket engine. The method includes pumping, at a first pump, a first portion of a fuel to a gas generator. The method further includes pumping, at a second pump, a first portion of an oxidizer to a gas generator. The method further includes combusting, at a gas generator, the first portion of the fuel and the first portion of the oxidizer to power the first pump and the second pump. The first pump is mechanically connected to a first turbine and the second pump is mechanically connected to a second turbine. The method further includes pumping, at the first pump, a second portion of the fuel to a third pump. The method further includes pumping, at the second pump, a second portion of the oxidizer to a fourth pump. The method further includes pumping, at the third pump, the second portion of the fuel to an expander cycle in a wall of a nozzle and into a third turbine and a fourth turbine. An output of the third turbine and an output of the fourth turbine are provided to a combustion chamber in the nozzle. The third turbine is mechanically connected to the third pump and the fourth turbine is mechanically connected to the fourth pump. The method further includes pumping, at the fourth pump, the second portion of the oxidizer into the combustion chamber. The method further includes combusting, at the combustion chamber, the second portion of the fuel and the second portion of the oxidizer to provide thrust from the nozzle.

In some implementations, the method includes expelling an output of the first turbine and an output of the second turbine as exhaust. In some implementations, the expander cycle changes a phase of the fuel. In some implementations, combusting the first portion of the fuel and the first portion of the oxidizer generates a gas that powers the first pump and the second pump. In some implementations, the method includes closing a first valve to block the passage of fuel to a gas generator, closing a second valve to block the passage of oxidizer to the gas generator, and using the hybrid rocket engine as an expander cycle rocket engine.

In accordance with an embodiment of the disclosure, a method is provided for combusting a fuel and an oxidizer in a hybrid rocket engine. The method includes pumping, at a first pump, a first portion of a fuel to a gas generator. The first pump is mechanically connected to a first turbine and a second turbine. The method further includes pumping, at a second pump, a first portion of an oxidizer to a gas generator. The second pump is mechanically connected to a third turbine and a fourth turbine. The method further includes combusting, at a gas generator, the first portion of the fuel and the first portion of the oxidizer to power the first pump and the second pump. The method further includes pumping, at the first pump, a second portion of the fuel to an expander cycle in a wall of a nozzle and into the second turbine and the fourth turbine. An output of the second turbine and an output of the fourth turbine are provided to a combustion chamber in the nozzle. The method further includes pumping, at the second pump, the second portion of the oxidizer into the combustion chamber. The method further includes combusting, at the combustion chamber, the second portion of the fuel and the second portion of the oxidizer to provide thrust from the nozzle.

In some implementations, the method includes expelling an output of the first turbine and an output of the third turbine as exhaust. In some implementations, the expander cycle changes a phase of the fuel. In some implementations, combusting the first portion of the fuel and the first portion of the oxidizer generates a gas that powers the first pump and the second pump. In some implementations, the method includes closing a first valve to block the passage of fuel to a gas generator, closing a second valve to block the passage of oxidizer to the gas generator, and using the hybrid rocket engine as an expander cycle rocket engine.

BRIEF DESCRIPTION OF THE DRAWINGS

Further features of the disclosure, its nature and various advantages, will be apparent upon consideration of the following detailed description, taken in conjunction with the accompanying drawings, in which:

FIG. 6 shows an illustrative flow diagram of a process for combusting a fuel and oxidizer in a single-stage hybrid cycle rocket engine, in accordance with an embodiment of the present disclosure.

DETAILED DESCRIPTION

To provide an overall understanding of the disclosure, certain illustrative embodiments will now be described, including systems and methods for a hybrid-cycle liquid propellant rocket engine. However, the systems and methods described herein may be adopted and modified as is appropriate for the application being addressed and that the systems and methods described herein may be employed in other suitable applications, and that such other additions and modifications will not depart from the scope thereof.

Common LPRE configurations include a gas generator cycle, an expander cycle, and a staged combustion cycle. Some variants of these engine configurations exist, such as the combustion tap-off and coolant-bleed cycle, however these variants may still be classified as one of either gas generator cycle, the expander cycle, or the staged combustion cycle. The expander cycle and the staged combustion cycle are referred to as "closed cycles" because all of the propellant is expelled from the rocket engine nozzle through its combustion chamber. On the other hand, the gas generator cycle is referred to as an "open cycle" because it divides the propellant flow into a main flow, which is routed to the rocket nozzle to produce thrust, and a smaller sub-flow, which is used to drive one or more pumps and is less effective at producing thrust.

Each cycle discussed above has advantages and disadvantages. For example, some engines are better suited for different purposes during launch (e.g., initial takeoff, upper stages, single start engine, or restartable engine). Each cycle may be better suited for a specific propellant pair and may have size limitations, and thus thrust limitations, of the engine. The most important measure of performance for a rocket engine is the amount of thrust produced by a given quantity of propellant, also called the specific impulse of the engine. Open cycles are less efficient (i.e., having a lower specific impulse) than closed cycles because a portion of the propellant is routed away from the combustion chamber to drive the turbines which power the pumps.

Another measure of performance is the amount of thrust produced by an engine of a given size or weight, also called the thrust-to-weight ratio. A factor that drives this metric is the pressure at which the propellants react in the combustion chamber. A higher pressure in the combustion chamber will result in higher thrust-to-weight ratio. A third measure of performance of a rocket engine is the atmospheric loss, which improves with increasing combustion chamber pressure. The systems and methods of the present disclosure allow for increased combustion chamber pressure in a rocket engine to improve its performance.

Figure 1:
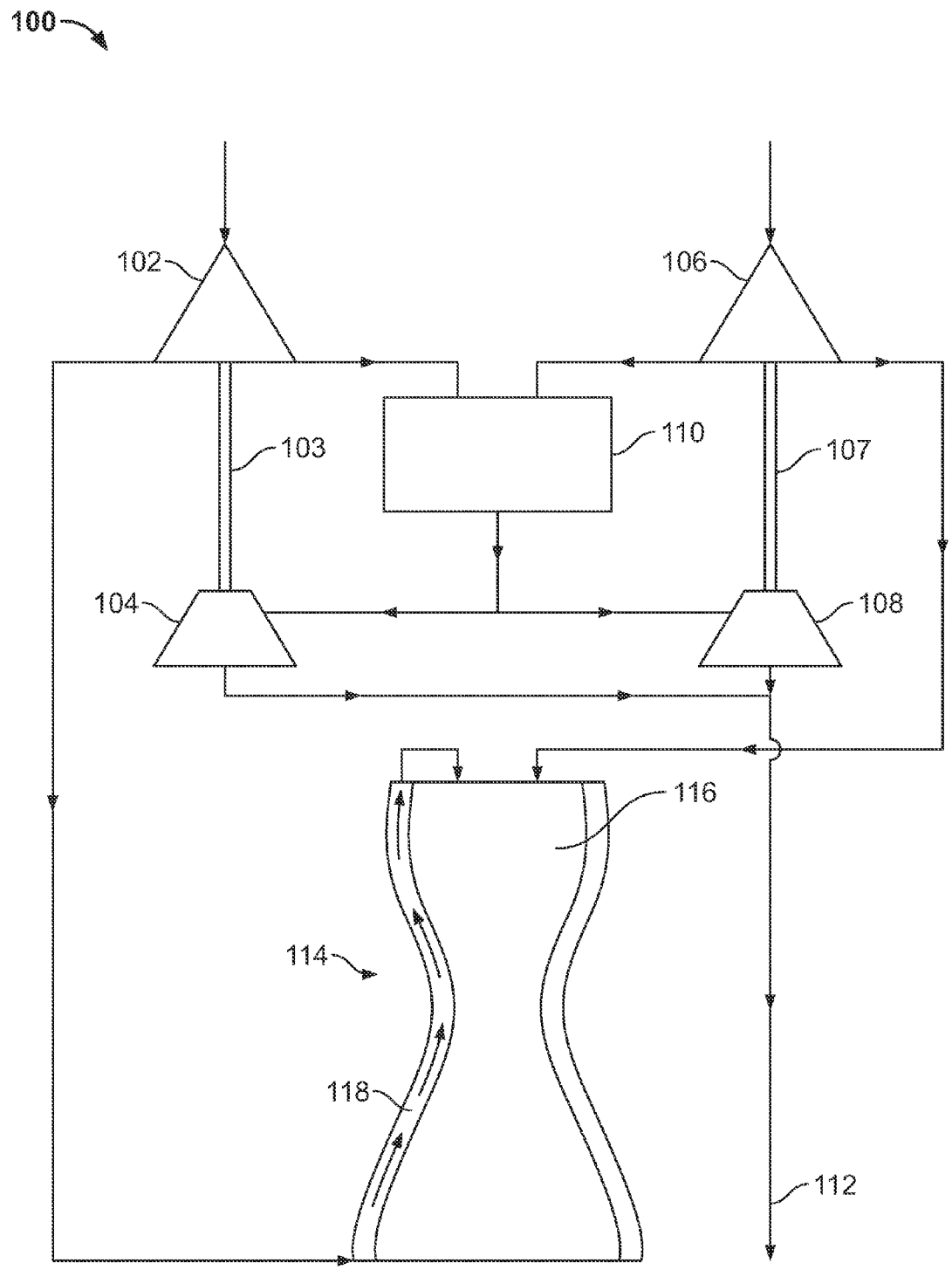
FIG. 1 shows an illustrative diagram of a gas generator cycle rocket engine.

FIG. 1 shows an illustrative diagram of a gas generator cycle rocket engine 100. In FIG. 1, gas generator cycle rocket engine 100 includes a fuel pump 102 that is mechanically coupled to a fuel turbine 104 by a shaft 103. Gas generator cycle also includes an oxidizer pump 106 that is mechanically coupled to an oxidizer turbine 108 by a shaft 107. A small quantity of fuel is tapped from the fuel pump 102 and a small quantity of oxidizer is tapped from the oxidizer pump 106 to gas generator 110. Gas generator 110 combusts the small quantities of fuel and oxidizer to produce an exhaust gas that drives the fuel turbine 104 and the oxidizer turbine 108. The exhaust gas is then expelled into the atmosphere via exhaust port 112. The pressurized fuel is passed through a wall 118 of the nozzle 114 and into a combustion chamber 116 of the nozzle 114, where the fuel is combined with the pressurized oxidizer to generate thrust. In some embodiments, the fuel pump and/or the oxidizer pump may be a turbo pump.

Figure 2:
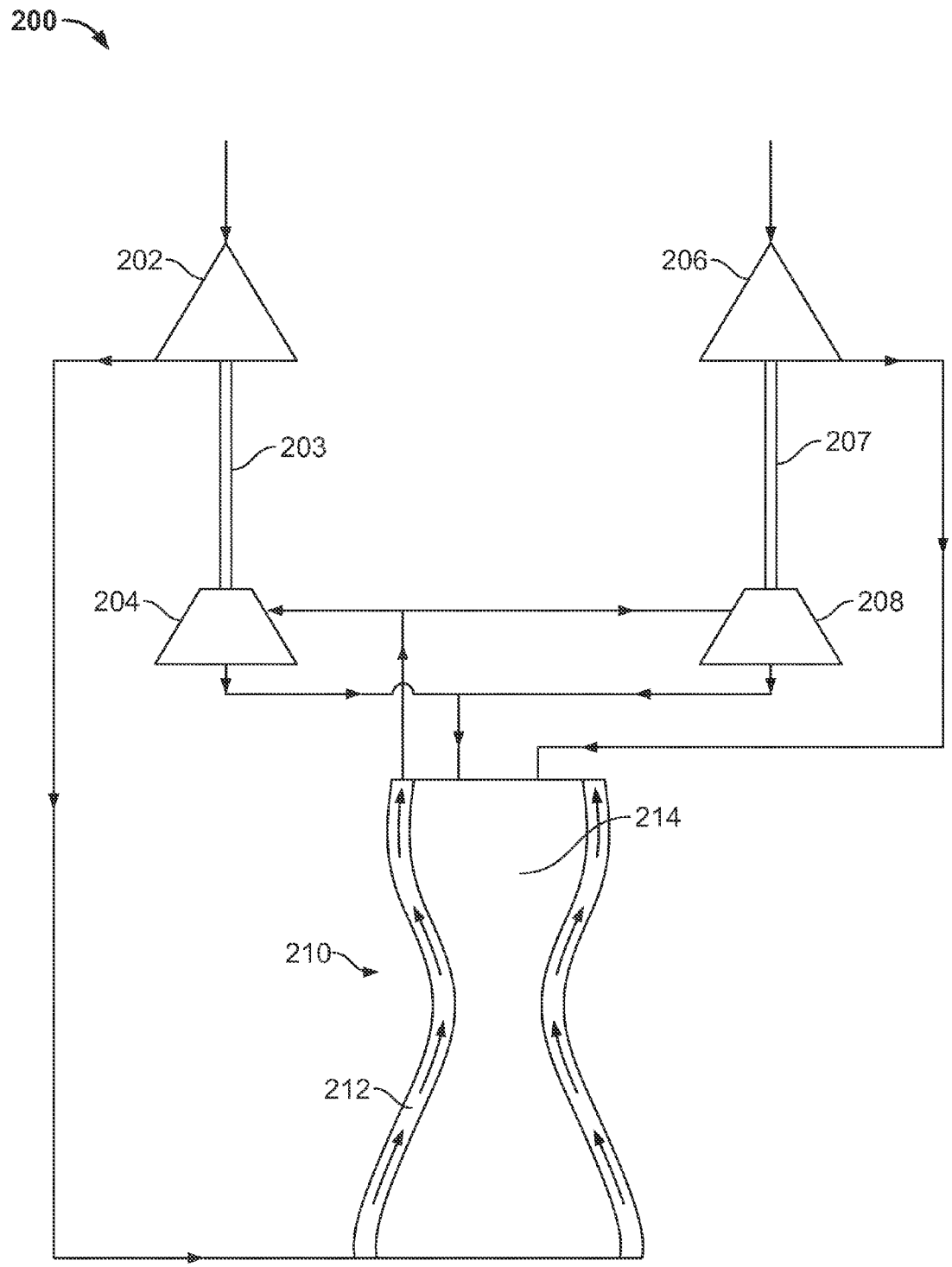
FIG. 2 shows an illustrative diagram of an expander cycle rocket engine.

FIG. 2 shows an illustrative diagram of an expander cycle rocket engine 200. In FIG. 2, expander cycle rocket engine 200 includes a fuel pump 202 that is mechanically coupled to a fuel turbine 204 by a shaft 203. Expander cycle rocket engine 200 also includes an oxidizer pump 206 that is mechanically coupled to an oxidizer turbine 208 by a shaft 207. Fuel from the fuel pump 202 is passed through a regenerative cooling arrangement, also called an expander cycle, in a wall 212 of a nozzle 210, where it is vaporized (e.g., changes phase from a liquid to a gas). This vaporization of the fuel drives the fuel turbine 204 and the oxidizer turbine 208, which in turn powers the fuel pump 202 and the oxidizer pump 206 that pressurize the fuel and oxidizer respectively. The pressurized gaseous fuel is then passed into a combustion chamber 214 of the nozzle 210 along with the pressurized oxidizer, where the fuel and oxidizer are combined to generate thrust. As this is a closed cycle, all fuel and all oxidizer are expelled from the nozzle 210.

Figure 3A:
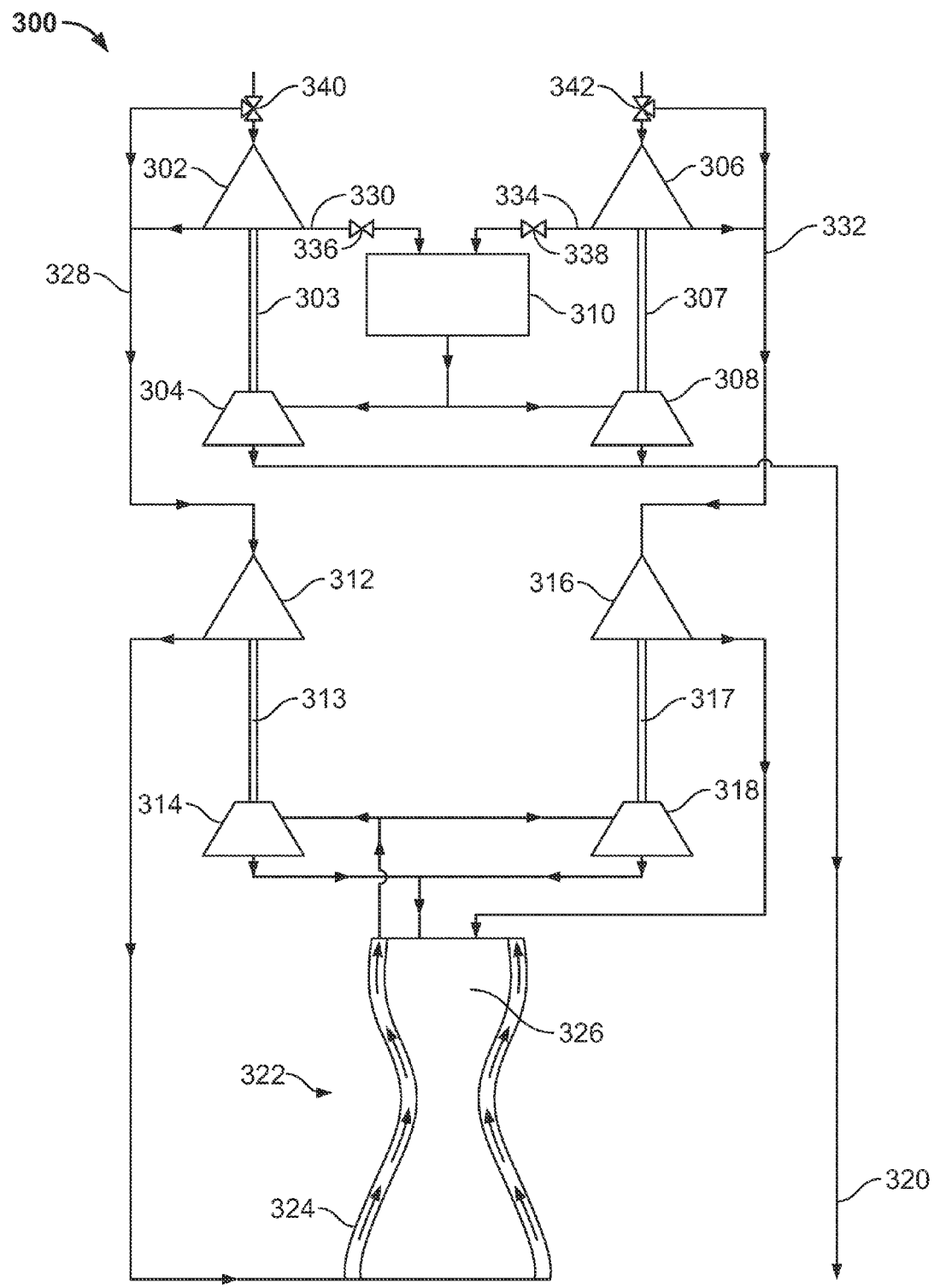
FIG. 3A shows an illustrative diagram of a two-stage hybrid cycle rocket engine, in accordance with an embodiment of the present disclosure.

FIG. 3A shows an illustrative diagram of a two-stage hybrid cycle rocket engine 300, in accordance with an embodiment of the present disclosure. The two-stage arrangement is advantageous because the engine could be designed to operate as a hybrid cycle or solely as an expander cycle rocket engine. The two-stage hybrid cycle rocket engine 300 will also have higher thrust and lower atmospheric losses due to a higher combustion chamber pressure when compared to a single-stage hybrid rocket engine discussed with respect to FIGS. 4A and 4B. In FIG. 3A, the fuel pressure and the oxidizer pressure are generated by a combination of energy from a regenerative cooling arrangement within the rocket nozzle and small quantities of fuel and oxidizer that are consumed in a gas generator to drive turbines that power pumps. In FIG. 3A, the two-stage hybrid cycle rocket engine 300 includes a fuel pump 302 that is mechanically coupled to a fuel turbine 304 by a shaft 303. The fuel pump 302 separates the fuel into a first fuel line 328 and a second fuel line 330. The second fuel line 330 may deliver a smaller volume of fuel than the first fuel line 328. Similarly, an oxidizer pump 306 is mechanically coupled to an oxidizer turbine 308 by a shaft 307. The oxidizer pump 306 separates the oxidizer into a first oxidizer line 332 and a second oxidizer line 334. The second oxidizer line 334 may deliver a smaller volume of oxidizer than the first oxidizer line 332. A small quantity of fuel is tapped from fuel pump 302 by the second fuel line 330 and a small quantity of oxidizer is tapped from oxidizer pump 306 by second oxidizer line 332 and passed to a gas generator 310. One of skill in the art will recognize that any suitable method of providing a portion of fuel or oxidizer to the gas generator may be used. For example, a portion of fuel or oxidizer may be provided to the gas generator by a separate pump from fuel pump 302 or oxidizer pump 306. In another example, the fuel line may split by a valve that provides a portion of fuel or oxidizer to the gas generator. The gas generator 310 combusts the small quantity of fuel and the small quantity of oxidizer to generate an exhaust gas that drives fuel turbine 304 and oxidizer turbine 308 as the hot gas is passed over the turbine blades in each turbine. The exhaust gas passes over the turbine blades, causing the turbine blades to rotate, which in turn causes the shaft to rotate, thus providing rotational power to the pump. The exhaust gas is expelled from the two-stage hybrid cycle rocket engine 300 by an exhaust port 320.

The fuel pump 302 passes the rest of the fuel to a second fuel pump 312 that is mechanically coupled to a second fuel turbine 314 by a shaft 313. Similarly, the oxidizer pump 306 passes the rest of the oxidizer to a second oxidizer pump 316 that is mechanically coupled to a second oxidizer turbine 318 by a shaft 317. In this embodiment, each shaft is isolated from the other, thus each pump has a dedicated turbine that powers it. The second fuel pump 312 passes the received fuel to a regenerative cooling apparatus in the wall 324 of a rocket nozzle 322. At this point, the fuel is vaporized by heat from the combustion of the fuel and the oxidizer in the combustion chamber 326. The vaporized fuel is then passed to the second fuel turbine 314 and the second oxidizer turbine 318 to drive both turbines and provide power to the second fuel pump 312 and the second oxidizer pump 316 respectively. The vaporized fuel is passed over the turbine blades in each turbine, causing the turbine blades to rotate. This rotation of the turbine blades causes the shaft to rotate, thus providing rotational power to the pump. After the vaporized fuel passes through the second fuel turbine 314 and the second oxidizer turbine 318, the pressurized fuel is passed to the combustion chamber 326, where it is combined with the pressurized oxidizer from the oxidizer pump 316 to produce thrust. While FIG. 3A only shows four pumps and four turbines, one of skill in the art would recognize that any suitable number of pumps and any suitable number of turbines may be used.

A hybrid cycle rocket engine may be beneficial during portions of flight where high thrust levels are beneficial, such as, but not limited to, liftoff. Higher pressures in the fuel and oxidizer lines resulting from the hybrid rocket engine configuration discussed herein will result in higher thrust to propel the rocket. In some embodiments, the hybrid cycle rocket engine 300 may be used as an expander cycle engine. As the rocket's propellants are used up during initial ascent (thus reducing the rocket's mass), a more efficient rocket engine may be better suited to efficiently use the remaining propellants during later stages of launch. To use the hybrid cycle rocket engine 300 in an expander cycle engine mode, which has higher efficiency than a gas generator engine as discussed above, valves 336 and 338 may be closed so that the gas generator 310 no longer receives portions of the fuel and the oxidizer from the second fuel line 330 and the second oxidizer line 334, respectively. In addition, or alternatively, valve 340 may route the fuel around the fuel pump 302 and valve 342 may route the oxidizer around the oxidizer pump 306 to "starve" the gas generator 310. Thus, all portions of the fuel and oxidizer will be used in producing thrust and no portions of fuel and oxidizer will be combusted in the gas generator 310 and expelled as exhaust at exhaust port 320. One of ordinary skill in the art will recognize that this process may be reversed at any point during launch, and the expander cycle engine may return to being used as a hybrid cycle engine by re-opening valves 336 and 338 and/or valves 340 and 342. For example, the hybrid cycle rocket engine 300 may be restarted after switching to an expander cycle mode by opening valves 336 and 338 and restarting the gas generator 310.

Figure 3B:
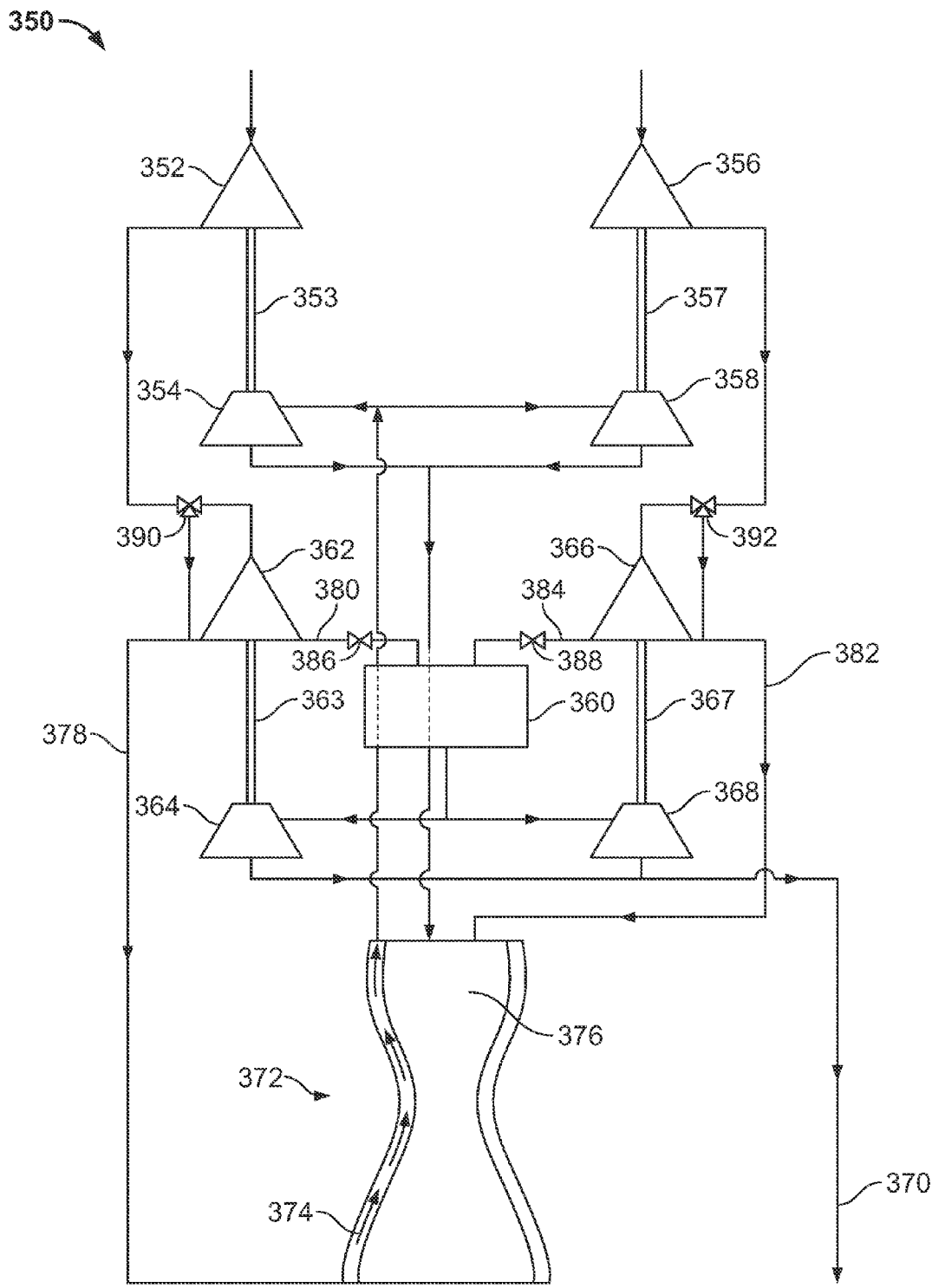
FIG. 3B shows an illustrative diagram of a two-stage hybrid cycle rocket engine, in accordance with an embodiment of the present disclosure.

FIG. 3B shows an illustrative diagram of a two-stage hybrid cycle rocket engine 350, in accordance with an embodiment of the present disclosure. In FIG. 3B, the fuel pressure and the oxidizer pressure are generated by a combination of energy from the regenerative cooling arrangement within the rocket nozzle and the small quantities of fuel and oxidizer that are consumed in a gas generator to drive turbines that power pumps. In FIG. 3B, two-stage hybrid cycle rocket engine 350 includes a fuel pump 352 that is mechanically coupled to a fuel turbine 354 by a shaft 353. The fuel pump 352 passes a fuel to a second fuel pump 362 that is mechanically coupled to a second fuel turbine 364 by a shaft 363. Similarly, two-stage hybrid cycle rocket engine 350 includes an oxidizer pump 356 that is mechanically coupled to an oxidizer turbine 358 by a shaft 357. The oxidizer pump 356 passes the oxidizer to a second oxidizer pump 366 that is mechanically coupled to a second oxidizer turbine 368 by a shaft 367. In this embodiment, each shaft is isolated from the other, thus each pump has a dedicated turbine that powers it.

The second fuel pump 362 separates the fuel into a first line 378 and a second fuel line 380. The second fuel line 380 may deliver a smaller volume of fuel than the first fuel line 378. Similarly, a second oxidizer pump 366 is mechanically coupled to a second oxidizer turbine 368 by a shaft 367. The second oxidizer pump 366 separates the oxidizer into a first oxidizer line 382 and a second oxidizer line 384. The second oxidizer line 382 may deliver a smaller volume of oxidizer than the first oxidizer line 382. A small quantity of fuel is tapped from the second fuel pump 362 by the second fuel line 380 and a small quantity of oxidizer is tapped from oxidizer pump 366 by second oxidizer line 384 and passed to a gas generator 360. The gas generator 360 combusts the small quantity of fuel and the small quantity of oxidizer to generate an exhaust gas that drives the second fuel turbine 364 and the second oxidizer turbine 368 as the hot gas is passed over the turbine blades in each turbine. The exhaust gas passes over the turbine blades, causing the turbine blades to rotate, which in turn causes the shaft to rotate, thus providing rotational power to the pump. The exhaust gas is expelled from the two-stage hybrid cycle engine 350 by an exhaust port 370.

The second fuel pump 362 passes the rest of the fuel to a regenerative cooling apparatus in the wall 374 of a rocket nozzle 372. At this point, the fuel is vaporizes by heat from the combustion of the fuel and the oxidizer in the combustion chamber 376. The vaporized fuel is then passed to the fuel turbine 354 and the oxidizer turbine 358 to drive both turbines and provide power to the fuel pump 352 and the oxidizer pump 356 respectively. The vaporized fuel is passed over the turbine blades in each turbine, causing the turbine blades to rotate. This rotation of the turbine blades causes the shaft to rotate, thus providing rotational power to the pump. After the vaporized fuel passes through the second fuel turbine 354 and the oxidizer turbine 358, the pressurized fuel is passed to the combustion chamber 376, where it is combined with the pressurized oxidizer from the oxidizer pump 366 to produce thrust. While FIG. 3B only shows four pumps and four turbines, one of skill in the art would recognize that any suitable number of pumps and any suitable number of turbines may be used.

A hybrid cycle rocket engine may be beneficial during portions of flight where high thrust levels are beneficial, such as, but not limited to, liftoff. Higher pressures in the fuel and oxidizer lines resulting from the hybrid rocket engine configuration discussed herein will result in higher thrust to propel the rocket. In some embodiments, the hybrid cycle rocket engine 350 may be used as an expander cycle engine. As the rocket's propellants are used up during initial ascent (thus reducing the rocket's mass), a more efficient rocket engine may be better suited to efficiently use the remaining propellants during later stages of launch. To use the hybrid cycle rocket engine 350 in an expander cycle engine mode, which has higher efficiency than a gas generator engine as discussed above, valves 386 and 388 may be closed so that the gas generator 360 no longer receives portions of the fuel and the oxidizer from the second fuel line 380 and the second oxidizer line 384, respectively. In addition, or alternatively, valve 390 may route the fuel around the fuel pump 362 and valve 392 may route the oxidizer around the oxidizer pump 366 to "starve" the gas generator 360. Thus, all portions of the fuel and oxidizer will be used in producing thrust and no portions of fuel and oxidizer will be combusted in the gas generator 360 and expelled as exhaust at exhaust port 370. One of ordinary skill in the art will recognize that this process may be reversed at any point during launch, and the expander cycle engine may return to being used as a hybrid cycle engine by re-opening valves 386 and 388 and/or valves 390 and 392. For example, the hybrid cycle rocket engine 350 may be restarted after switching to an expander cycle mode by opening valves 386 and 388 and restarting the gas generator 360.

Figure 4A:
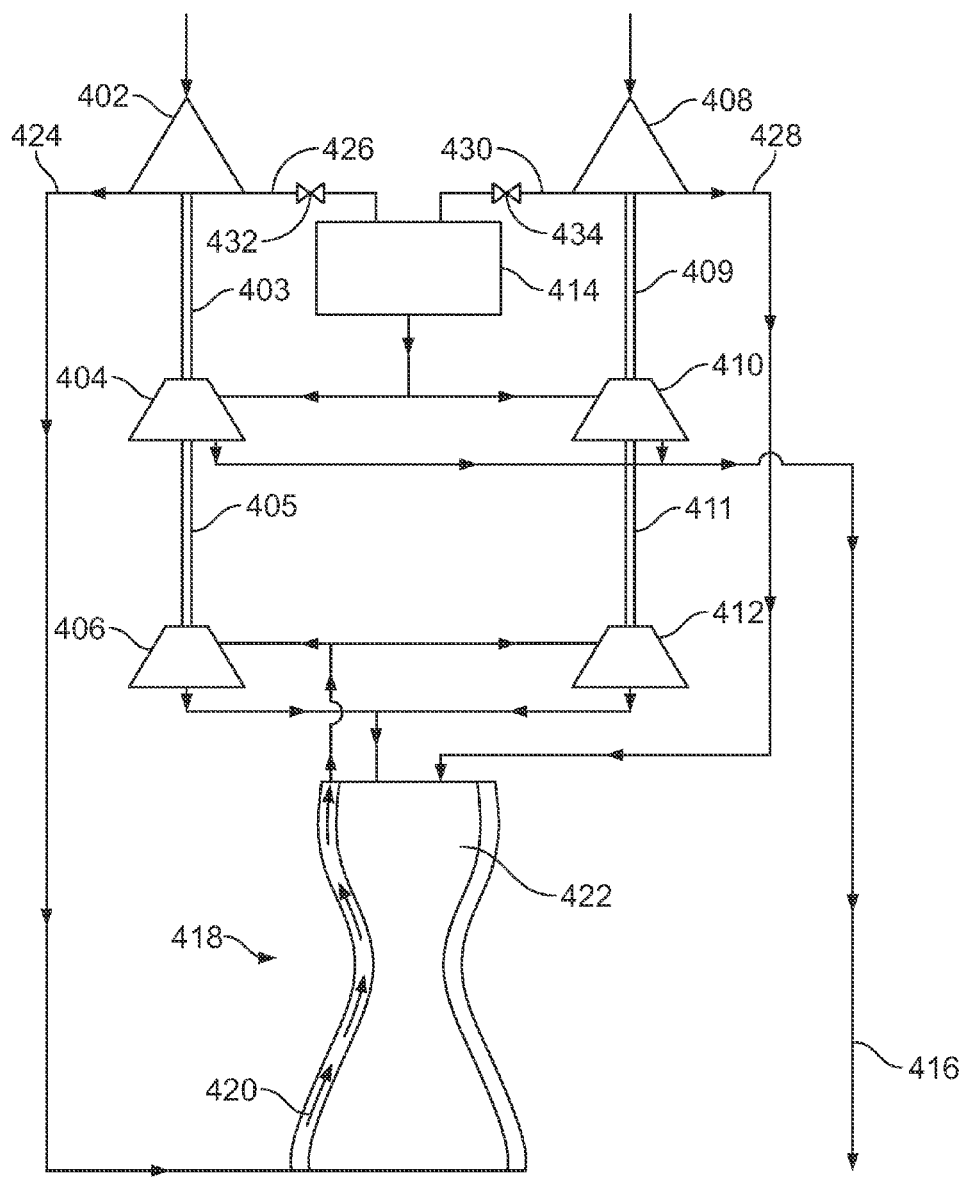
FIG. 4A shows an illustrative diagram of a single-stage hybrid cycle rocket engine, in accordance with an embodiment of the present disclosure.

FIG. 4A shows an illustrative diagram of a single-stage hybrid cycle rocket engine, in accordance with an embodiment of the present disclosure. A single-stage arrangement is advantageous because it has a lower number of components, which will reduce the cost and weight of the engine. In FIG. 4A, the fuel pressure and the oxidizer pressure are generated by a combination of energy from the regenerative cooling arrangement within the rocket nozzle and the small quantities of fuel and oxidizer that are consumed in a gas generator. The single-stage hybrid cycle rocket engine 400 includes a fuel pump 402 that is mechanically coupled to a fuel turbine 404 by a shaft 403. The fuel turbine 404 is also mechanically coupled to a second fuel turbine 406 by a shaft 405. Thus, the fuel pump 402 is powered by both turbines 404 and 406. In some embodiments, the fuel turbine 404 and the second fuel turbine 406 are connected in series. The fuel pump 402 separates the fuel into a first fuel line 424 and a second fuel line 426. The second fuel line 426 may deliver a smaller volume of fuel than the first fuel line 424.

Similarly, an oxidizer pump 408 is mechanically coupled to an oxidizer turbine 410 by a shaft 409. The oxidizer turbine is also mechanically coupled to a second oxidizer turbine 412 by a shaft 411. Thus, the oxidizer pump 408 is powered by both turbines 410 and 412. In some embodiments, the oxidizer turbine 410 and the second oxidizer turbine 412 are connected in series. The oxidizer pump 408 separates the oxidizer into a first oxidizer line 428 and a second oxidizer line 430. The second oxidizer line 430 may deliver a smaller volume of oxidizer than the first oxidizer line 428. A small quantity of fuel is tapped from fuel pump 402 by the second fuel line 426 and a small quantity of oxidizer is tapped from oxidizer pump 408 by second oxidizer line 430 and passed to a gas generator 414. The gas generator 414 combusts the small quantity of fuel and the small quantity of oxidizer to generate an exhaust gas that drives fuel turbine 404 and oxidizer turbine 410 as the hot gas is passed over the turbine blades in each turbine. The exhaust gas passes over the turbine blades, causing the turbine blades to rotate, which in turn causes the shaft to rotate, thus providing rotational power to the pump. The exhaust gas is expelled from the single-stage hybrid cycle rocket engine 400 by an exhaust port 416.

The fuel pump 402 passes the rest of the fuel through first fuel line 424 to a regenerative cooling apparatus in the wall 420 of a rocket nozzle 418. At this point, the fuel is vaporized by heat from the combustion of the fuel and the oxidizer in the combustion chamber 422. The vaporized fuel is then passed to the second fuel turbine 406 and the second oxidizer turbine 412 to drive both turbines and provide power to the fuel pump 402 and the oxidizer pump 412. The vaporized fuel is passed over the turbine blades in each turbine, causing the turbine blades to rotate. This rotation of the turbine blades causes the shaft to rotate, thus providing rotational power to the pump. After the vaporized fuel passes through the second fuel turbine 406 and the second oxidizer turbine 412, the vaporized fuel is passed to the combustion chamber 422, where it is combined with pressurized oxidizer from the first oxidizer line 428 of the oxidizer pump 408 to produce thrust. While FIG. 4A only shows two pumps and four turbines, one of skill in the art would recognize that any suitable number of pumps and any suitable number of turbines may be used.

A hybrid cycle rocket engine may be beneficial during portions of flight where high thrust levels are beneficial, such as, but not limited to, liftoff. Higher pressures in the fuel and oxidizer lines resulting from the hybrid rocket engine configuration discussed herein will result in higher thrust to propel the rocket. In some embodiments, the hybrid cycle rocket engine 400 may be used as an expander cycle engine. As the rocket's propellants are used up during initial ascent (thus reducing the rocket's mass), a more efficient rocket engine may be better suited to efficiently use the remaining propellants during later stages of launch. To use the hybrid cycle rocket engine 400 in an expander cycle engine mode, which has higher efficiency than a gas generator engine as discussed above, valves 432 and 434 may be closed so that the gas generator 414 no longer receives portions of the fuel and the oxidizer from the second fuel line 426 and the second oxidizer line 430, respectively. Thus, all portions of the fuel and oxidizer will be used in producing thrust and no portions of fuel and oxidizer will be combusted in the gas generator 414 and expelled as exhaust at exhaust port 416. One of ordinary skill in the art will recognize that this process may be reversed at any point during launch, and the expander cycle engine may return to being used as a hybrid cycle engine by re-opening valves 432 and 434. For example, the hybrid cycle rocket engine 400 may be restarted after switching to an expander cycle mode by opening valves 432 and 434 and restarting the gas generator 414.

Figure 4B:
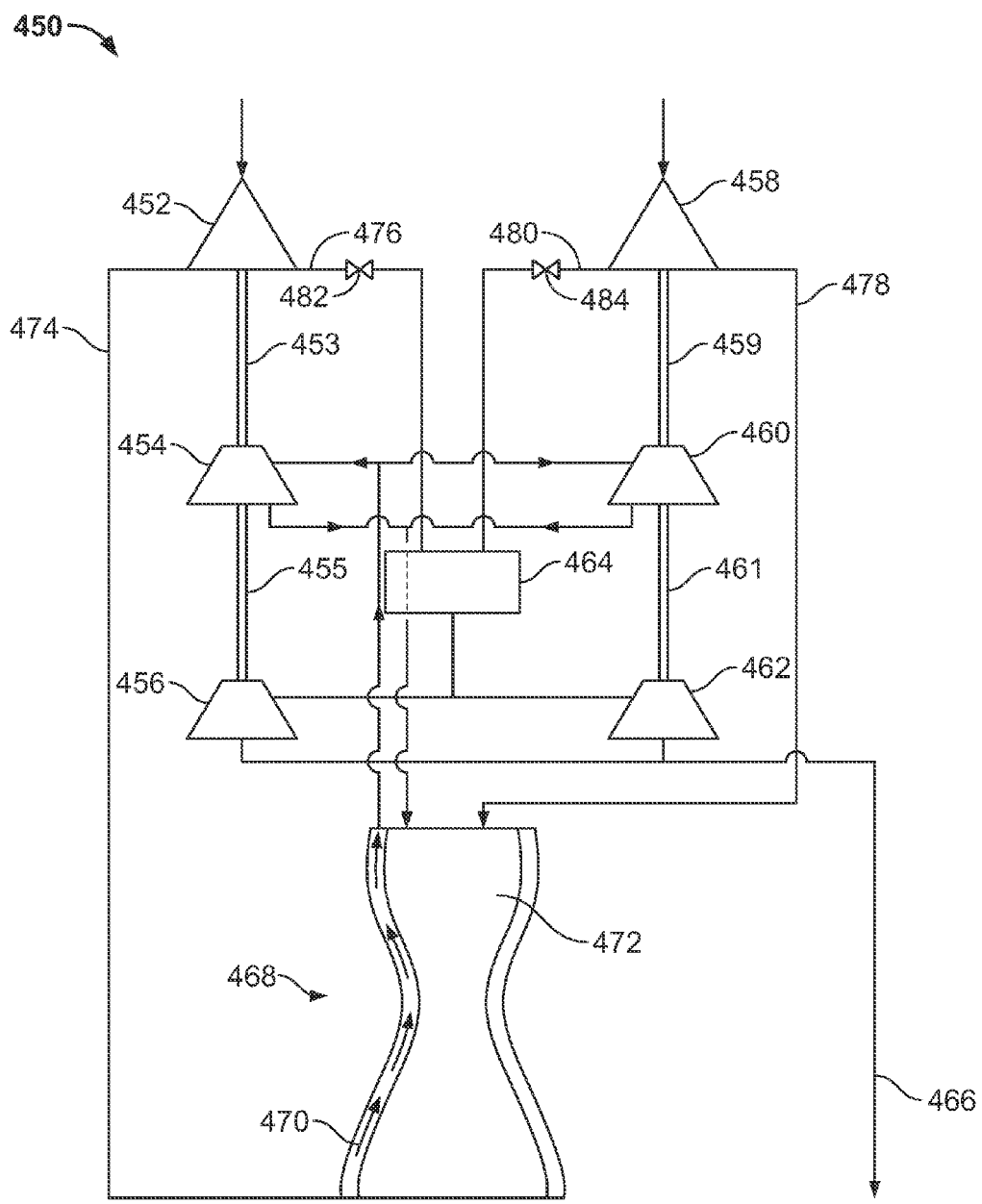
FIG. 4B shows an illustrative diagram of a single-stage hybrid cycle rocket engine, in accordance with an embodiment of the present disclosure.

FIG. 4B shows an illustrative diagram of a single-stage hybrid cycle rocket engine 450, in accordance with an embodiment of the present disclosure. In FIG. 4B, the fuel pressure and the oxidizer pressure are generated by a combination of energy from the regenerative cooling arrangement within the rocket nozzle and the small quantities of fuel and oxidizer that are consumed in a gas generator. The single-stage hybrid cycle rocket engine 450 includes a fuel pump 452 that is mechanically coupled to a fuel turbine 454 by a shaft 453. The fuel turbine 454 is also mechanically coupled to a second fuel turbine 456 by a shaft 455. Thus, the fuel pump 452 is powered by both turbines 454 and 456. In some embodiments, the fuel turbine 454 and the second fuel turbine 456 are connected in series. The fuel pump 452 separates the fuel into a first fuel line 474 and a second fuel line 476. The second fuel line 426 may deliver a smaller volume of fuel than the first fuel line 474.

Similarly, an oxidizer pump 458 is mechanically coupled to an oxidizer turbine 460 by a shaft 459. The oxidizer turbine 460 is also mechanically coupled to a second oxidizer turbine 462 by a shaft 461. Thus, the oxidizer pump 458 is powered by both turbines 460 and 462. In some embodiments, the oxidizer turbine 460 and the second oxidizer turbine 462 are connected in series. The oxidizer pump 458 separates the oxidizer into a first oxidizer line 478 and a second oxidizer line 480. The second oxidizer line 480 may deliver a smaller volume of oxidizer than the first oxidizer line 478. A small quantity of fuel is tapped from fuel pump 452 by the second fuel line 476 and a small quantity of oxidizer is tapped from oxidizer pump 458 by second oxidizer line 470 and passed to a gas generator 464. The gas generator 464 combusts the small quantity of fuel and the small quantity of oxidizer to generate an exhaust gas that drives the second fuel turbine 456 and the second oxidizer turbine 462 as the hot gas is passed over the turbine blades in each turbine. The exhaust gas passes over the turbine blades, causing the turbine blades to rotate, which in turn causes the shaft to rotate, thus providing rotational power to the pump. The exhaust gas is expelled from the hybrid cycle rocket engine 450 by an exhaust port 466.

The fuel pump 452 passes the rest of the fuel through first fuel line 474 to a regenerative cooling apparatus in the wall 470 of a rocket nozzle 468. At this point, the fuel is vaporized by heat from the combustion of the fuel and the oxidizer in a combustion chamber 472. The vaporized fuel is then passed to the fuel turbine 454 and the oxidizer turbine 460 to drive both turbines and provide power to the fuel pump 452 and the oxidizer pump 458. The vaporized fuel is passed over the turbine blades in each turbine, causing the turbine blades to rotate. This rotation of the turbine blades causes the shaft to rotate, thus providing rotational power to the pump. After the vaporized fuel passes through the fuel turbine 454 and the oxidizer turbine 460, the vaporized fuel is passed to the combustion chamber 472, where it is combined with the oxidizer from the first oxidizer line 478 of the oxidizer pump 458 to produce thrust. While FIG. 4B only shows two pumps and four turbines, one of skill in the art would recognize that any suitable number of pumps and any suitable number of turbines may be used.

A hybrid cycle rocket engine may be beneficial during portions of flight where high thrust levels are beneficial, such as, but not limited to, liftoff. Higher pressures in the fuel and oxidizer lines resulting from the hybrid rocket engine configuration discussed herein will result in higher thrust to propel the rocket. In some embodiments, the hybrid cycle rocket engine 450 may be used as an expander cycle engine. As the rocket's propellants are used up during initial ascent (thus reducing the rocket's mass), a more efficient rocket engine may be better suited to efficiently use the remaining propellants during later stages of launch. To use the hybrid cycle rocket engine 450 in an expander cycle engine mode, which has higher efficiency than a gas generator engine as discussed above, valves 482 and 484 may be closed so that the gas generator 464 no longer receives portions of the fuel and the oxidizer from the second fuel line 476 and the second oxidizer line 480, respectively. Thus, all portions of the fuel and oxidizer will be used in producing thrust and no portions of fuel and oxidizer will be combusted in the gas generator 464 and expelled as exhaust at exhaust port 466. One of ordinary skill in the art will recognize that this process may be reversed at any point during launch, and the expander cycle engine may return to being used as a hybrid cycle engine by re-opening valves 482 and 484. For example, the hybrid cycle rocket engine 450 may be restarted after switching to an expander cycle mode by opening valves 482 and 484 and restarting the gas generator 464.

Figure 5:
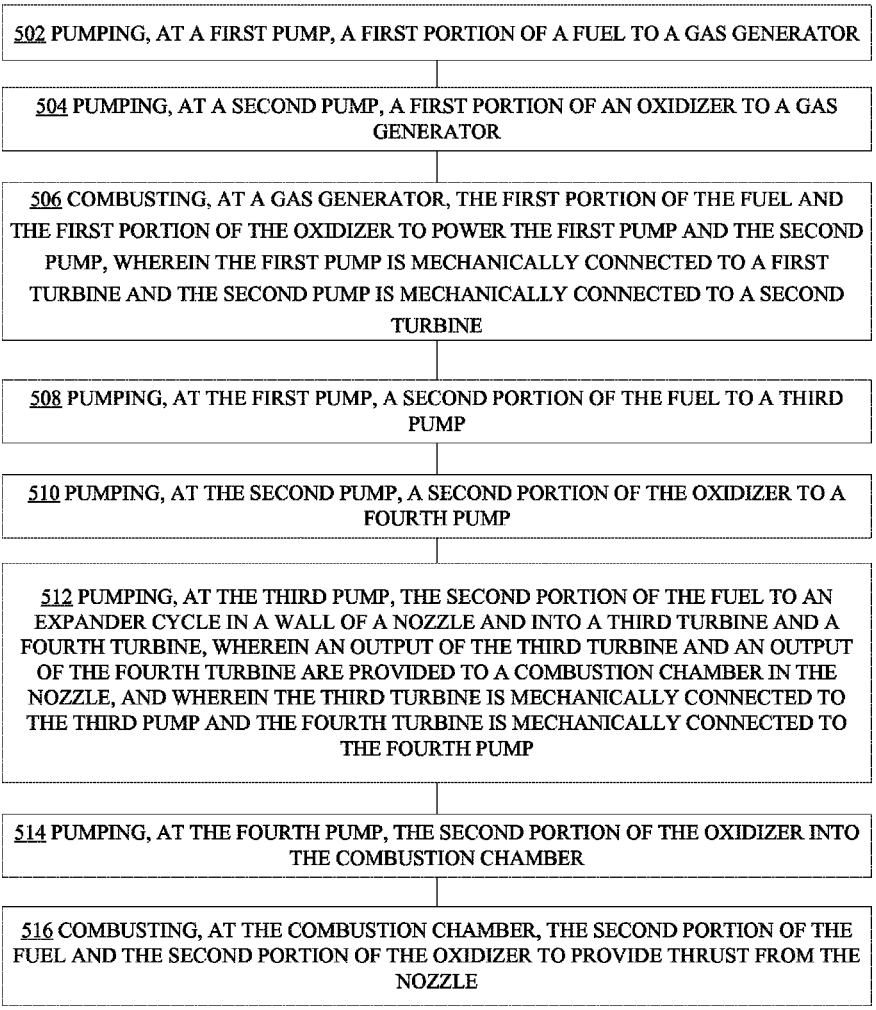
FIG. 5 shows an illustrative flow diagram of a process for combusting a fuel and oxidizer in a two-stage hybrid cycle rocket engine, in accordance with an embodiment of the present disclosure.

FIG. 5 shows an illustrative flow diagram of a process 500 for combusting a fuel and oxidizer in a two-stage hybrid cycle; in accordance with an embodiment of the present disclosure. At 502, a first pump pumps a first portion of a fuel to a gas generator. At 504, a second pump pumps a first portion of oxidizer to a gas generator. At 506, a gas generator combusts the first portion of the fuel and the first portion of the oxidizer to power a first turbine and a second turbine. One of skill in the art will recognize that the ratio of the first portion of fuel to the first portion of oxidizer may be any suitable ratio. For example, the ratio of fuel to oxidizer needed for combustion in the gas generator may be 1:1. The first turbine is mechanically connected to the first pump and the second turbine is mechanically connected to the second pump. The first turbine and the second turbine power their respective pump through a shaft. As the exhaust from the gas generator passes through the first turbine and the second turbine, the gas turns the turbine blades, thus providing power to the fuel pump and the oxidizer pump.

At 508, the first pump pumps a second portion of the fuel to a third pump. In some embodiments, the second portion of the fuel may be greater than the first portion of the fuel. At 510, the second pump pumps a second portion of the oxidizer to a fourth pump. In some embodiments, the second portion of the oxidizer may be greater than the first portion of the oxidizer. At 512, the third pump pumps the second portion of the fuel to an expander cycle in a wall of a nozzle and into a third turbine and a fourth turbine. An output of the third turbine and an output of the fourth turbine are provided to a combustion chamber in the nozzle. The third turbine is mechanically connected to the third pump and the fourth turbine is mechanically connected to the fourth pump. The third turbine may be connected to the third pump by a shaft and the fourth turbine may be connected to the fourth pump by a shaft. In some embodiments, each turbine is mechanically isolated from other turbines in the hybrid cycle. At 514, the fourth pump pumps the second portion of the oxidizer into the combustion chamber. At 516, the second portion of the fuel and the second portion of the oxidizer are combusted in the combustion chamber to provide thrust from the nozzle.

FIG. 6 shows an illustrative flow diagram of a process 600 for combusting a fuel and oxidizer in a single-stage hybrid cycle; in accordance with an embodiment of the present disclosure. At 602, a first pump pumps a first portion of a fuel to a gas generator. The first pump is mechanically connected to a first turbine and a second turbine. In some embodiments, first turbine and the second turbine are connected in series. At 604, a second pump pumps a first portion of an oxidizer to a gas generator. The second pump is mechanically connected to a third turbine and a fourth turbine. In some embodiments, third turbine and the fourth turbine are connected in series. At 606, the first portion of the fuel and the first portion of the oxidizer are combusted at a gas generator to power a first turbine and a second turbine. At 608, the first pump pumps a second portion of the fuel to an expander cycle in a wall of a nozzle and into a third turbine and a fourth turbine. An output of the third turbine and an output of the fourth turbine are provided to a combustion chamber in the nozzle. At 610, the second pump pumps a second portion of the oxidizer into the combustion chamber. At 612, the second portion of the fuel and the second portion of the oxidizer are combusted at a combustion chamber to provide thrust from the nozzle.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A hybrid rocket engine comprising:
   a first pump powered by a first turbine;
   a second pump powered by a second turbine;
   a gas generator connected to the first pump and the second pump, wherein an output of the gas generator is connected to the first turbine and the second turbine to provide mechanical power to the first pump and the second pump;
   a third pump powered by a third turbine;
   a fourth pump powered by a fourth turbine; and
   a nozzle comprising an expander cycle in a wall and a combustion chamber;
   wherein an output of the third pump is connected to the expander cycle, and an output of the expander cycle is connected to the third turbine and the fourth turbine to provide mechanical power to the third pump and the fourth pump, and
   wherein an output of the fourth pump, an output of the third turbine, and an output of the fourth turbine are connected to the combustion chamber.

2. The hybrid rocket engine of claim 1, wherein an output of the first turbine and an output of the second turbine are expelled as exhaust.

3. The hybrid rocket engine of claim 1, wherein the first turbine, the second turbine, the third turbine, and the fourth turbine are isolated from one another.

4. The hybrid rocket engine of claim 1, wherein the first pump and the third pump are configured to pump a fuel, and the second pump and the fourth pump are configured to pump an oxidizer.

5. The hybrid rocket engine of claim 1, wherein the gas generator is configured to combust a portion of a fuel from the first pump and a portion of an oxidizer from the second pump to produce a gas that powers the first pump and the second pump.

6. A hybrid rocket engine comprising:
   a first pump powered by a first turbine and a second turbine, wherein the first turbine and the second turbine are mechanically connected;
   a second pump powered by a third turbine and a fourth turbine, wherein the third turbine and the fourth turbine are mechanically connected;
   a gas generator connected to the first pump and the second pump, wherein an output of the gas generator is connected to the first turbine and the third turbine to provide mechanical power to the first pump and the second pump; and
   a nozzle comprising an expander cycle in a wall and a combustion chamber;
   wherein an output of the first pump is connected to the expander cycle, and an output of the expander cycle is connected to the second turbine and the fourth turbine to provide mechanical power to the first pump and the second pump, and wherein an output of the second pump, an output of the third turbine, and an output of the fourth turbine are connected to the combustion chamber.

7. The hybrid rocket engine of claim 6, wherein an output of the first turbine and an output of the second turbine are expelled as exhaust.

8. The hybrid rocket engine of claim 6, wherein the first turbine and the second turbine are connected in series to the first pump, and the third turbine and the fourth turbine are connected in series to the second pump.

9. The hybrid rocket engine of claim 6, wherein the first pump is configured to pump a fuel and the second pump is configured to pump an oxidizer.

10. The hybrid rocket engine of claim 6, wherein the gas generator is configured to combust a portion of a fuel from the first pump and a portion of an oxidizer from the second pump to produce a gas that powers the first pump and the second pump.

11. A method of combusting a fuel and an oxidizer in a hybrid rocket engine, the method comprising:
pumping, at a first pump, a first portion of a fuel to a gas generator;
pumping, at a second pump, a first portion of an oxidizer to a gas generator;
combusting, at a gas generator, the first portion of the fuel and the first portion of the oxidizer to power the first pump and the second pump, wherein the first pump is mechanically connected to a first turbine and the second pump is mechanically connected to a second turbine;
pumping, at the first pump, a second portion of the fuel to a third pump;
pumping, at the second pump, a second portion of the oxidizer to a fourth pump;
pumping, at the third pump, the second portion of the fuel to an expander cycle in a wall of a nozzle and into a third turbine and a fourth turbine, wherein an output of the third turbine and an output of the fourth turbine are provided to a combustion chamber in the nozzle, and wherein the third turbine is mechanically connected to the third pump and the fourth turbine is mechanically connected to the fourth pump;
pumping, at the fourth pump, the second portion of the oxidizer into the combustion chamber;
combusting, at the combustion chamber, the second portion of the fuel and the second portion of the oxidizer to provide thrust from the nozzle.

12. The method of claim 11, further comprising expelling an output of the first turbine and an output of the second turbine as exhaust.

13. The method of claim 11, wherein the expander cycle changes a phase of the fuel.

14. The method of claim 11, wherein combusting the first portion of the fuel and the first portion of the oxidizer generates a gas that powers the first pump and the second pump.

15. The method of claim 11, further comprising closing a first valve to block the passage of fuel to the gas generator, closing a second valve to block the passage of oxidizer to the gas generator, and using the hybrid rocket engine as an expander cycle rocket engine.

16. A method of combusting a fuel and an oxidizer in a hybrid rocket engine, the method comprising:
pumping, at a first pump, a first portion of a fuel to a gas generator, wherein the first pump is mechanically connected to a first turbine and a second turbine;
pumping, at a second pump, a first portion of an oxidizer to a gas generator, wherein the second pump is mechanically connected to a third turbine and a fourth turbine;
combusting, at a gas generator, the first portion of the fuel and the first portion of the oxidizer to power the first pump and the second pump;
pumping, at the first pump, a second portion of the fuel to an expander cycle in a wall of a nozzle and into the second turbine and the fourth turbine, wherein an output of the second turbine and an output of the fourth turbine are provided to a combustion chamber in the nozzle;
pumping, at the second pump, the second portion of the oxidizer into the combustion chamber;
combusting, at the combustion chamber, the second portion of the fuel and the second portion of the oxidizer to provide thrust from the nozzle.

17. The method of claim 16, further comprising expelling an output of the first turbine and an output of the third turbine as exhaust.

18. The method of claim 16, wherein the expander cycle changes a phase of the fuel.

19. The method of claim 16, wherein combusting the first portion of the fuel and the first portion of the oxidizer generates a gas that powers the first pump and the second pump.

20. The method of claim 16, further comprising closing a first valve to block the passage of fuel to the gas generator, closing a second valve to block the passage of oxidizer to the gas generator, and using the hybrid rocket engine as an expander cycle rocket engine.

* * * * *